United States Patent [19]

Simonsen et al.

[11] Patent Number: 4,522,118
[45] Date of Patent: Jun. 11, 1985

[54] VACUUM AGITATOR FOR MEAT PRODUCTS

[76] Inventors: Knud Simonsen, P.O. Box 4, Nobleton, Ontario; Mirek Holan, 50 Panorama Ct., #1509, Rexdale, Ontario, both of Canada

[21] Appl. No.: 350,342

[22] Filed: Feb. 19, 1982

[30] Foreign Application Priority Data

Feb. 23, 1981 [CA] Canada ................................. 371477

[51] Int. Cl.³ ........................... A23B 4/02; B01F 7/16
[52] U.S. Cl. ........................................ 99/472; 99/348; 99/535; 366/139; 366/347
[58] Field of Search ................ 99/472, 532, 533, 516, 99/535; 366/139, 343, 251, 325, 233, 347, 245, 366/251, 342, 197, 199–201, 204, 206; 426/266, 426/281, 519, 641, 404; 17/25

[56] References Cited

U.S. PATENT DOCUMENTS 4,038,426  7/1977  Jespersen et al. ................ 426/266
4,432,650  2/1984  Langen et al. ................... 99/535 X

FOREIGN PATENT DOCUMENTS 1079494  4/1960  Fed. Rep. of Germany ........ 99/472
733168  10/1932  France ............................. 366/249

Primary Examiner—Timothy F. Simone

[57] ABSTRACT

A vacuum processing apparatus having a chamber, defining an open bottom, and having a closed top, the size of such chamber being sufficient to receive a processing container, and the height of such chamber being sufficient to fit completely over such container, and stirring means extending downwardly within the chamber to extend into the container, when enclosed within said chamber, and having power operated rotating means and sealing means around the open bottom of the chamber, for forming a good air-tight seal, means for raising and lowering the chamber and means for evacuating air from said chamber.

Also disclosed is a method of processing the contents of a container, in which the contents are first stirred in a container by a stirrer at atmospheric pressure and are then further stirred, in the same container under vacuum, by means of a stirrer located in a vacuum chamber.

12 Claims, 5 Drawing Figures

VACUUM AGITATOR FOR MEAT PRODUCTS

The invention relates to vacuum processing apparatus, and a method of vacuum processing, and in particular to the processing of meat products.

Processing of various products by agitation or stirring is sometimes improved by carrying out such process under vacuum.

In the case of the processing of meat sections, and in particular pickling of such sections in a predetermined quantity of brine or other pickling or flavouring liquid solution is, first of all injected into the meat sections, which are then placed in a tank and stirred or massaged while the liquid penetrates and disperses throughout the meat. Usually a further small quantity of liquid is added to the tank, and, by the end of the processing time, this too is taken up in the meat. When the processing term is finished, which may be a period of twelve to twenty-four hours or more, the meat sections, typically being hams, picnics or briskets, or other meat sections, are then further processed by packaging them in some form of containers, and they may either be cooked or smoked or both smoked and cooked. During this second processing stage, the meat products are required to bind together into a more or less homogeneous mass, adopting the shape of the container. The binding of the meat sections together is achieved by the liquid protein which is developed from the meat sections, during the massaging and pickling operations.

Continuously subjecting the meat sections to a massaging action during the pickling term may advantageously be carried out by apparatus such as that disclosed in U.S. Pat. No. 4,038,426. In this type of apparatus relatively large tanks are filled with between one and two thousand pounds of meat sections which are then continuously stirred and massaged by a suitable massaging apparatus such as that disclosed in the aforesaid U.S. patent. In order to provide for a regulated processing sequence large numbers of such storage tanks and massagers are used.

Even when massaging is carried out with great care, air bubbles still remain in the meat sections. These air bubbles are resistant to penetration of the pickling liquid. In the finished product they appear as grey spots in an otherwise pink mass of meat. This is unsightly and detracts from the appeal of the product.

Certain proposals have been made to agitate or stir meat sections during pickling, while subjecting them to a vacuum or reduced pressure. It has been found that by doing this, air, which might otherwise be included in the mixture of meat sections and brine, and the air bubbles actually entrapped in the meat sections themselves, are evacuated and withdrawn. This greatly improves the appearance of the end product. However, in order to take advantage of this process, it has been proposed to manufacture entirely new pickling tanks and agitators, which incorporate vacuum drawing equipment, at very considerable cost. This solution might possibly be acceptable for the construction of an entirely new processing plant. However, in a great majority of cases processing plants will already have some form of existing massaging apparatus and tanks such as that disclosed in U.S. Pat. No. 4,038,426. It is simply uneconomic to dispose of such existing equipment, and replace it with new, much more expensive equipment.

In accordance with the invention, it has now been found that it is not necessary to maintain a vacuum throughout the entire period of pickling and massaging. The advantages of vacuum massaging can in fact be achieved in a relatively short time. Such vacuum massaging term can be in the order of from about five minutes to sixty minutes. This may also reduce the total massaging time, even though the remainder of the massaging is carried out at normal atmospheric pressure.

This can of course be carried out with specially designed vacuum massaging equipment, but at very considerable cost.

It would also be possible to transfer the meat sections from the existing massaging tanks, to special vacuum massaging equipment, and back again after treatment.

However, this would be time consuming and messy.

The present invention is directed generally to the provision of vacuum processing apparatus which is adaptable for use with existing pickling tanks, so that air bubbles may be reduced or eliminated, and at the same time the investment in presently owned machinery is not wasted.

With a view to achieving the foregoing advantages, the invention will be seen to comprise a vacuum chamber, defining an open bottom, and having a closed top, the size of such chamber being sufficient to receive a processing tank therein, and the height of such chamber being sufficient to fit completely over such tank, and stirring means extending downwardly within said chamber adapted to extend into a said processing tank, when enclosed within said chamber, and power operated means for rotating the same, and sealing means around said open bottom of said chamber, for forming a good air-tight seal, and means for evacuating air from said chamber.

The invention further comprises a method of processing meat sections, in which meat sections are first stirred in a container in the presence of pickling liquid by a stirrer at atmospheric pressure and are then further stirred, in the same container under vacuum, by means of a stirrer located in a vacuum chamber.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 5:
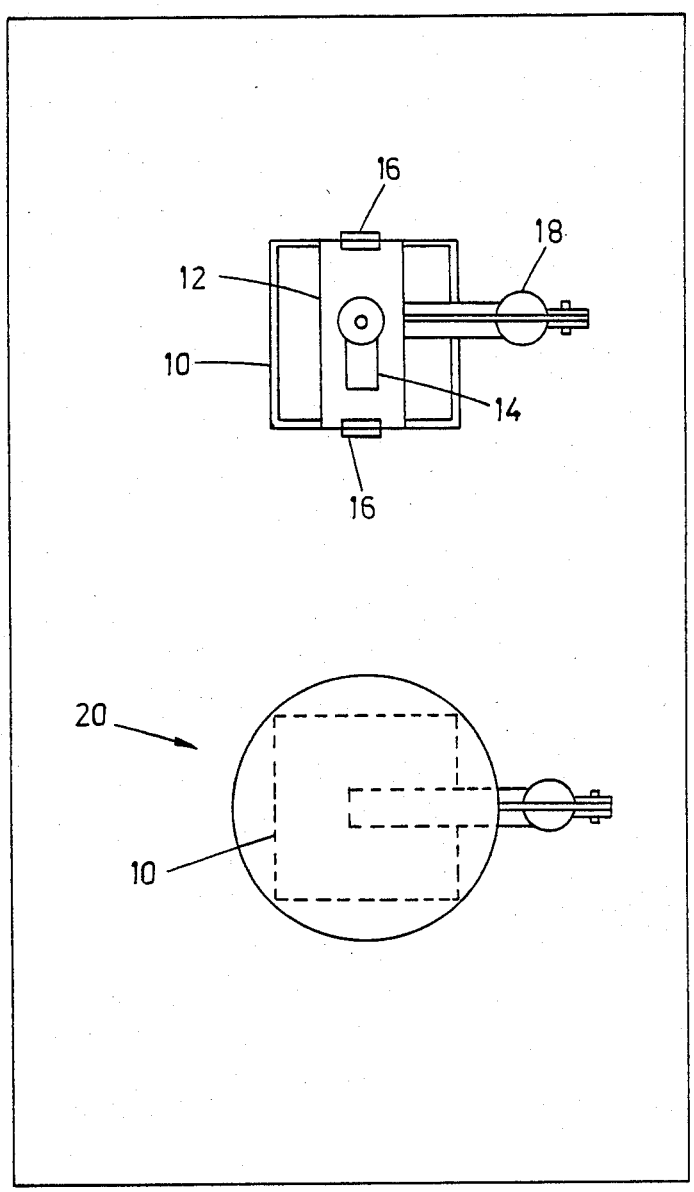
FIG. 5 is a schematic illustration, in plan, of a typical processing plant, showing a vacuum processor, and an atmospheric pressure massager.

Referring first of all to FIG. 5, the plan view of a processing plant shows the location of a pickling tank 10, having an open top, and containing meat sections (not shown). A support cross member 12 carries a suitable motor and reducing gear 14, and stirring arms extending downwardly into tank 10 in a manner described in the aforesaid U.S. patent. The supporting plate 12 is removably secured to the tank 10 by means of releaseable clips 16 and may be raised by hoist 18. The tanks 10 are movable, and may be lifted and carried by means of fork lift trucks (not shown) such as are in common use.

In accordance with the invention, one or more vacuum stirring units may be supplied, one being shown in FIG. 5 for the sake of clarity only, and being indicated generally as 20. A pickling tank 10 is shown in position in phantom.

Figure 1:
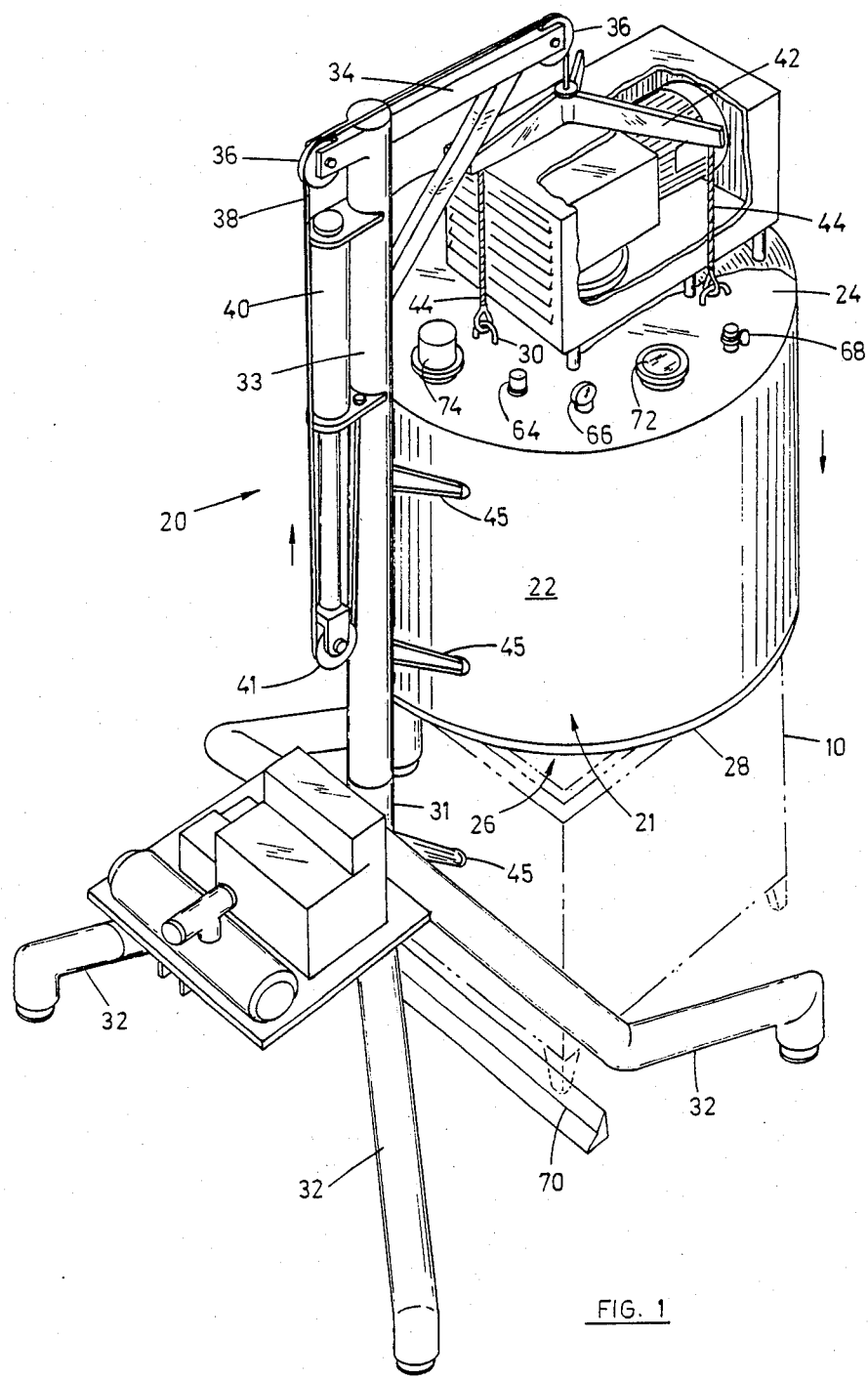
FIG. 1 is an upper perspective view of the vacuum massaging apparatus according to the invention shown in its raised position.
Figure 3:
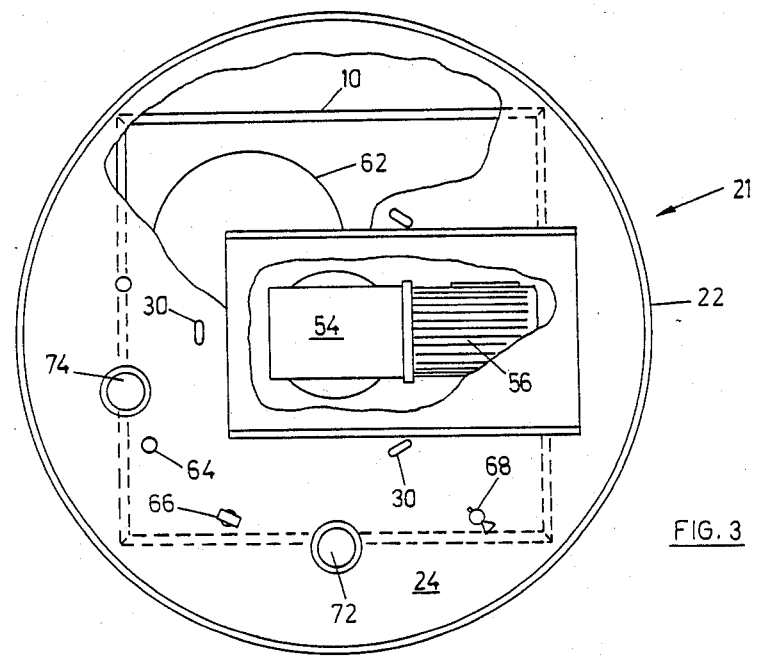
FIG. 3 is a top plan view of the apparatus of FIG. 2.
Figure 2:
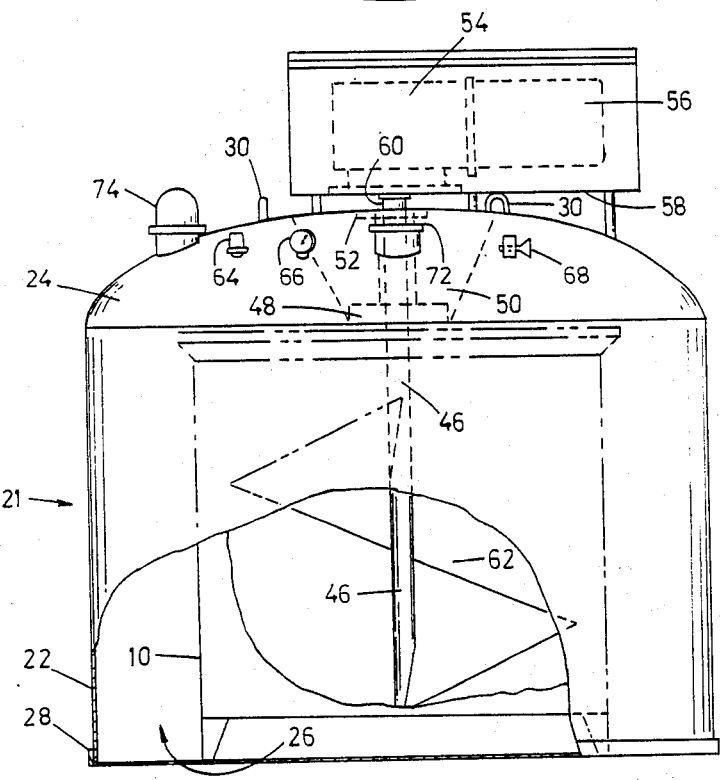
FIG. 2 is a cut away side elevational view of the vacuum massaging apparatus.
Figure 4:
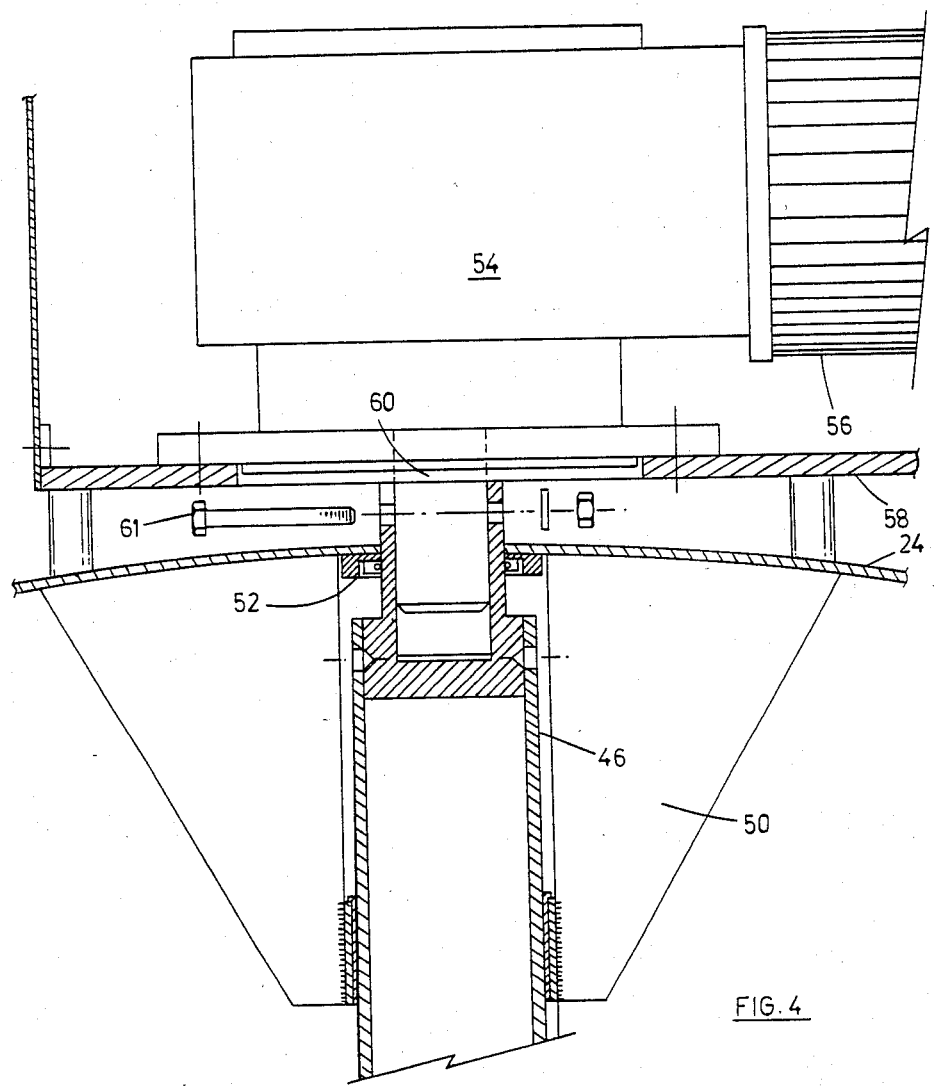
FIG. 4 is an enlarged elevation of a portion of FIG. 2.

Referring now to FIGS. 1 and 2, it will be seen that vacuum processor 20 according to the invention comprises a bell shaped vacuuming chamber 21 having cylindrical side wall 22 and generally convexly domed top 24. The bottom of cylindrical wall 22 defines an open bottom 26 around which a sealing member 28 is provided. Lifting lugs 30 are provided at spaced locations, by means of which the member 21 may be raised and lowered. A suitable hoist tower 31 having four spaced apart support legs 32, is located as a free standing structure on the floor.

A rotatable sleeve 33 is located on tower 31 and has at its upper end an arm 34 provided with pulleys 36 at each end.

A cable or chain 38, the lower end of which is operated by any suitable power operated means such as the cylinder 40 and pulley 41 on sleeve 33, runs over pulleys 36, and at its free end is attached to a generally star-shaped hoisting frame 42, typically having three arms extending outwardly to cables or chains 44 located vertically above respective three lifting lugs 30 and connected with them. The use of three arms and three lugs is merely exemplary.

Guide brackets 45 are located on sleeve 33 for guiding chamber 21.

As better shown in FIG. 2, a stirring shaft 46 extends down the central axis of cylindrical wall 22, and is rotatably supported in bearing 48, which is located spaced beneath the dome shaped top 24 by means of brackets 50. The upper end of shaft 46 is hollow and is provided with a hollow coupling sleeve 47 which extends upwardly through a suitable seal 52 and through dome shaped top 24. A right angle drive gear which may incorporate a reduction gear, is indicated generally as 54 being driven by any suitable form of motor which may be electrical, hydraulic or the like indicated generally as 56. The right angle drive and motor are supported on a suitable platform 58.

A drive stub shaft 60 extends downwardly from drive gear 54 and into sleeve 47. They are fastened by means such as bolt 61.

On the lower free end of shaft 46 there is provided a spiral agitator blade 62. Blade 62 is welded directly to shaft 46, and extends outwardly therefrom a predetermined distance.

It will be appreciated that the blade 62 and the shaft 46 will be required to descend into a large mass of meat contained in pickling tank 10, and after massaging and stirring for a certain period of time, it must then be withdrawn again.

For this purpose the control system may include means for slowly rotating the shaft 46 as it moves into or out of the mass of meat sections.

A suitable opening, and nipple 64 is provided, through which the air entrapped within the interior of the bell chamber 21 may be evacuated, the specific vacuum pump mechanism being omitted for the sake of clarity. In addition, a pressure gauge 64 and vacuum breaking valve 68 are provided.

This is merely exemplary. A vacuum line and air evacuation hole could equally well be located in the floor so as to avoid flexible hose connections to the chamber.

It will be observed that the bell-like chamber 21 makes a reasonably close fit around the corners of the rectangular tank 10. Tank 10 must therefore be positioned with some degree of accuracy.

In many cases such accurate centering can be achieved by a skilled operator simply guiding the tank 10 on a fork-lift truck to a point directly beneath the shaft 46. In some cases however it may be desirable to provide some form of guidance or assistance to such operator. In this case markings can simply be painted on the floor at the appropriate place for the legs of tank 10. Alternatively, if desired some form of metal rail or guide member indicated generally as 70 may be provided as shown in FIG. 1. Whatever form such guidance means may take whether it be simply a mark or a physical member, it is referred to herein as registration means.

It is also apparent that the floor beneath the chamber 21 should be smooth and flat such that the sealing ring 28 can make a good hermetic seal around the open lower end of chamber 21. In the majority of cases at least in modern meat packing plants the floor will already be finished to a smooth accurate finish sufficient to provide a good seal.

In operation, meat products (not shown) usually being sections of meats to be pickled, will have been loaded into tank 10 elsewhere in the plant. The meat sections will have been injected with pickling liquid, and a certain further additional amount of pickling liquid is usually added to the tank 10.

The meat sections will then usually be subjected to massaging, at atmospheric pressure by means of the massaging unit indicated generally as 12 in FIG. 5. Such massaging may continue for a period of a predetermined time after which, by means of hoist 14 the massager 12 may be withdrawn from tank 10. Tank 10 is then moved typically by a fork-lift truck (not shown) to a location on the plant floor, as shown in FIG. 5 to vacuum processor 20. Chamber 21 is at this time in its raised and swung away position as shown in FIG. 1. As noted above the tank 10 is accurately located, if necessary by any suitable registration means such as that described, so that it will register beneath shaft 46, when chamber 21 is swung back over tank 10.

Chamber 21 is then swung over tank 10 and cylinder 40 is operated so as to gradually lower the chamber 21 over tank 10. As it is lowered, the motor 56 may be operated so as to slowly rotate the shaft 46, thereby permitting the blade 62 to enter the mass of meat sections in tank 10 while minimizing resistance.

Once the vacuum chamber 21 has been lowered to floor level, the sealing ring 28 engages the floor, and the air trapped in the chamber 21 is then evacuated by means of suitable vacuum pumping means (not shown) until a predetermined vacuum is reached. Motor 56 may continue to rotate shaft 46 slowly-ie about 3-7 rpm while such evacuation is taking place, and once the predetermined vacuum has been reached rotation of shaft 46 will continue at about the same speed for a predetermined length of time. Rotation takes place in such direction so that the spiral blade 62 causes meat sections at the bottom of the tank to be raised upwardly to the top. Simultaneously, meat sections at the top of the tank will sink downwardly. Vacuumising of the top layer of meat takes place continuously. In this way the meat sections within the tank are thoroughly vacuumised, while being massaged, and meat sections at all parts of the tank will eventually be brought to the surface for vacuumising.

The objective of this form of agitation is to ensure that all meat sections are exposed to the reduced pressure, so that any air or air bubbles trapped therein may be rapidly withdrawn. Depending upon the type of meat, and the size of the meat sections and other factors, such vacuum massaging may be complete within a relatively short time.

In any event, once vacuum processing has been completed, the motor 56 may then be reversed, and operated slowly, while the cylinder 40 is operated so as to raise the chamber 21 upwardly. As it rises, the blade 62 will gradually withdraw from the meat sections. Chamber 21 is then swung to one side.

The tank 10 may then be removed, again by means such as a fork-lift truck, and may be delivered to any other location (not shown) in the plant, for further processing.

In practice it is found that vacuum processing can be completed in a relatively short time. In this way complete penetration of the pickling liquid is achieved and air bubbles are removed. This produces improvements in the appearance of the meat products themselves and they are in better condition as a result. In addition, this form of operation permits an efficient use of existing plant such as tanks 10 and massagers 12, while the additional investment required for the vacuum processor 20 is kept to a minimum consistent with efficiency.

Such treatment is carried out without transferring the meat sections from one container to another, thus avoiding extra handling.

In some cases it may be helpful to observe the process in action. For this purpose a window 72 may be located in domed top 24. A light 74 may also be located in top 24, offset from window 76. Both will be engineered to withstand the reduced pressure within chamber 21.

While the invention is described particularly for use in meat processing it will also have other applications, both in food processing and any other treatment of a product where agitation under vacuum is desirable.

Having described what is believed to be the best mode by which the invention may be performed, it will be seen that the invention may be particularly defined as follows:

Vacuum processing apparatus for vacuum processing the contents of a container of predetermined size without transferring the contents, and comprising a vacuum chamber having an open bottom, and a closed top, chamber being of sufficient size to receive such a container therein, and the height of such chamber being sufficient to fit completely over said container, stirring means within said chamber, power operated means for rotating the same whereby the contents of such container may be continuously brought to the surface and thus exposed to reduced pressure from removal of air entrapped therein, sealing means around said open bottom of said chamber, means for raising and lowering said chamber, and means for evacuating the atmosphere within said chamber.

The foregoing is a description of a preferred embodiment of the invention which is given here by way of example only. The invention is not to be taken as limited to any of the specific features as described, but comprehends all such variations thereof as come within the scope of the appended claims.

The embodiments of the invention in which an exclusive property or privilege is claimed are defined as follows:

1. Vacuum processing apparatus for use in combination with a container of predetermined width and height, and having a bottom wall, side walls and an open top, said apparatus comprising;

a vacuum chamber having an open bottom, side walls and a closed top, said chamber being of a width and height greater than said container to receive said container therein, and the height of such chamber being sufficient to fit completely over said oven top of and said side walls of said container with said open top and side walls freely enclosed therewith in;

stirring means within said chamber extending downwardly into said container through said open top;

power operated means for rotating said stirring means whereby the contents of said container may be stirred;

sealing means around said open bottom of said chamber whereby to hermetically enclose said container;

means for raising and lowering said chamber relative to said container, and, means for evacuating the atmosphere within said chamber around the exterior of, and within said container.

2. Vacuum processing apparatus as claimed in claim 1 including registration means adapted to be placed on a surface beneath said chamber, for accurately locating a said container directly beneath said chamber.

3. Vacuum processing apparatus as claimed in claim 2 including a floor beneath said chamber, said floor having a flat surface for engagement by and with said sealing means, and including registration means on said floor.

4. Vacuum processing apparatus as claimed in claim 3 wherein said registration means comprises rail means fastened on said surface of said floor.

5. Vacuum processing apparatus as claimed in claim 1 wherein said vacuum chamber is provided with opening means, and hose connection means, whereby a vacuum hose may be connected thereto, for evacuating the atmosphere within said chamber.

6. Vacuum processing apparatus as claimed in claim 4, including vacuum conduit means and air opening means in said floor, for evacuating the atmosphere of said chamber therethrough.

7. Vacuum processing apparatus as claimed in claim 1, wherein said stirring means comprises shaft means within said chamber, blade means on said shaft means, said blade means being designed to raise the contents of said chamber upwardly to the surface thereof so as to continuously exchange such contents from the bottom to the top, for continuously vacuumizing the surface portion of such contents.

8. Vacuum processing apparatus as claimed in claim 7, including shaft connection means extending upwardly through said closed top of said chamber, said power operated means being mounted on said closed top, outside of said chamber, and being connected to said shaft connection means, and including vacuum seal means on said closed top, around said shaft connection means.

9. Vacuum processing apparatus as claimed in claim 1 including hoist means for raising and lowering said vacuum chamber.

10. Vacuum processing apparatus as claimed in claim 9 including hoisting frame means, flexible connection means between said hoisting frame means and said chamber, a flexible hoisting element connected to said hoisting frame, pulley means around which said hoisting element runs, and power operated means for operating said flexible hoisting element.

11. Vacuum processing apparatus as claimed in claim 10 including movement means, whereby said vacuum chamber may be moved in a horizontal plane, when the same is in its raised position.

12. Vacuum processing apparatus as claimed in claim 11 including guide means on said hoist means for guiding said chamber while the same is moving between its raised and lowered position.

* * * * *